United States Patent [19]
Taylor et al.

[11] Patent Number: 5,534,572
[45] Date of Patent: Jul. 9, 1996

[54] POLYETHYLENE WITH REDUCED MELT FRACTURE

[75] Inventors: Joseph W. Taylor, Halton Hills; Shivendra K. Goyal, Calgary; Norman D. J. Aubee, Okotoks; Nick K. K. Bohnet, Calgary, all of Canada

[73] Assignee: Novacor Chemicals Ltd., Calgary, Canada

[21] Appl. No.: 498,970

[22] Filed: Jul. 6, 1995

Related U.S. Application Data

[62] Division of Ser. No. 387,270, Feb. 13, 1995, Pat. No. 5,459,187.

[51] Int. Cl.$^6$ .............................. C08L 91/06; C08K 5/06
[52] U.S. Cl. ................ 524/275; 524/377; 524/545; 524/546; 428/36.9; 428/373
[58] Field of Search ..................... 524/275, 377, 524/545, 546; 428/36.9, 373

[56] References Cited

U.S. PATENT DOCUMENTS

| | | | |
|---|---|---|---|
| 3,125,547 | 3/1964 | Blatz | 260/45.5 |
| 3,222,314 | 12/1965 | Wolinski | 260/33.2 |
| 4,829,116 | 5/1989 | Piesold | 525/278 |
| 4,855,360 | 8/1989 | Duchesne et al. | 525/187 |
| 4,863,983 | 9/1989 | Johnson et al. | 524/140 |
| 4,983,677 | 1/1991 | Johnson et al. | 525/127 |
| 5,015,693 | 5/1991 | Duchesne et al. | 525/187 |

FOREIGN PATENT DOCUMENTS

0060673A1  9/1982  European Pat. Off. ........ C08L 23/02

*Primary Examiner*—Joseph L. Schofer
*Assistant Examiner*—N. Sarofim
*Attorney, Agent, or Firm*—Bruce E. Harang

[57] ABSTRACT

The present invention relates to a polyolefin composition, having good extrusion characteristics. The composition comprises a fluoropolymer; one or more of a low molecular weight $C_{1-4}$ alkyl ethers of a poly $C_{2-4}$ alkylene oxide; and a metal oxide the weight ratio of the ether to fluoropolymer being less than 1:1. The blend is suitable for making blown film.

11 Claims, 1 Drawing Sheet

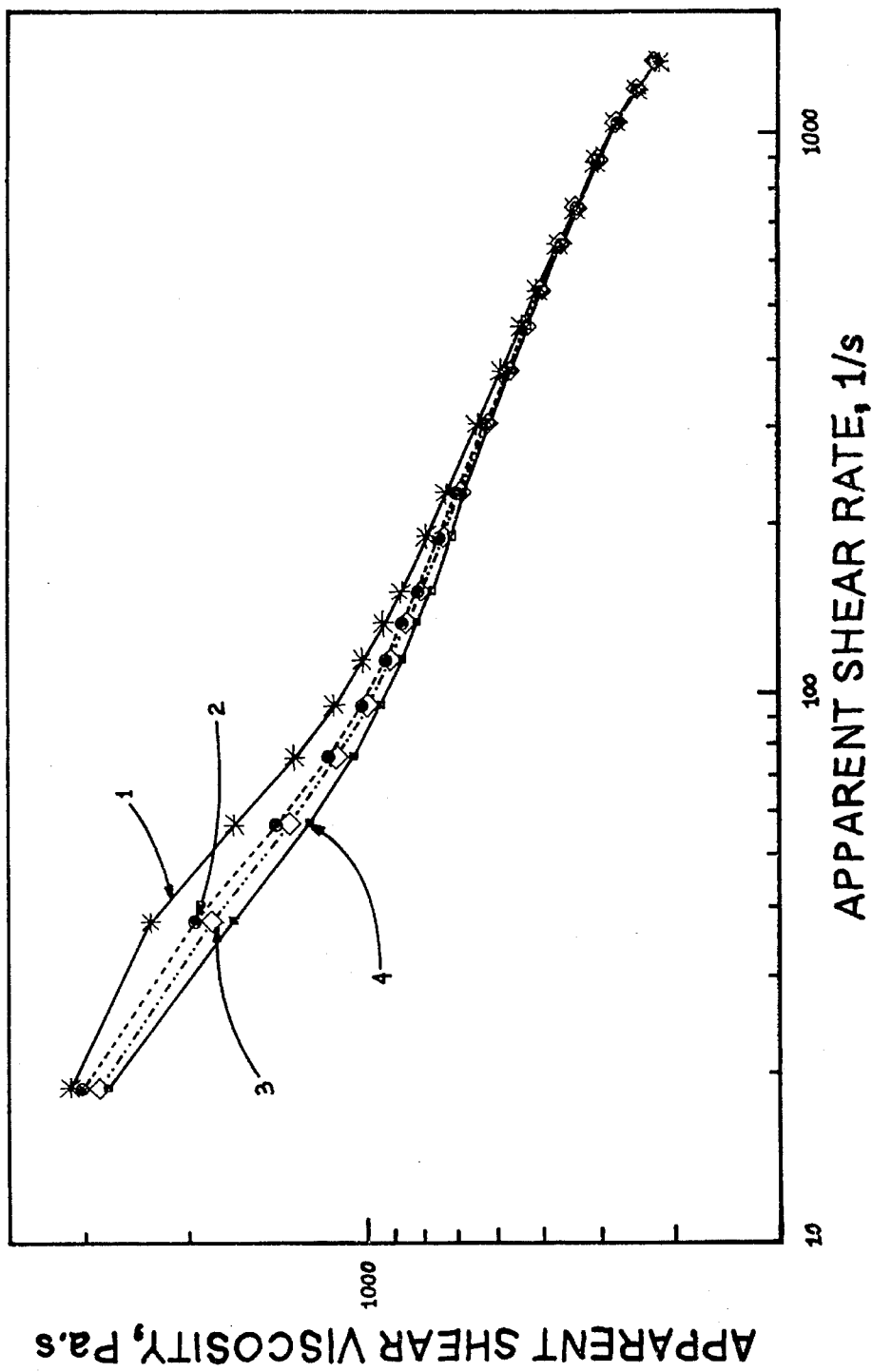

POLYETHYLENE WITH REDUCED MELT FRACTURE

This is a divisional of application Ser. No. 08/387,270 filed on Feb. 13, 1995 now U.S. Pat. No. 5,459,187.

FIELD OF THE INVENTION

The present invention relates to polyolefins suitable for use in extrusion processes. More particularly the present invention relates to polyolefin compositions suitable for the manufacture of blown film having a good surface appearance.

BACKGROUND OF THE INVENTION

In the manufacture of extruded polymers there are a number of surface defects referred to as sharkskin, snakeskin and orange peel which all are related to the rheology of the polymer melt and in particular the melt fracture of the polymer. Melt fracture arises when the shear rate at the surface of the polymer is sufficiently high that the surface of the polymer begins to fracture. That is there is a slippage of the surface of the extruded polymer relative the body of the polymer melt. The surface generally can't flow fast enough to keep up with the body of the extrudate and a fracture in the melt occurs generally resulting in a loss of surface properties for the extrudate.

U.S. Pat. No. 3,125,547 issued Mar. 17, 1964 assigned to E. I. DuPont de Nemours and Company discloses blends of polyethylene and small amounts of fluoropolymers to provide a smooth surface on extrudate at high extrusion speeds.

U.S. Pat. No. 3,222,314 issued Dec. 7, 1965, assigned to E. I. DuPont de Nemours and Company discloses blends of polyethylene and low molecular weight polyethylene glycol to provide a heat sealable film suitable for printing.

European Patent Application 0 060 673 published 22.09.82 discloses the use of low molecular weight polyalkylene oxides as a processing aid in the manufacture of extruded polyolefins.

There are a series of patents in the name of the Minnesota Mining and Manufacturing Company relating to the use of a combination of polyalkylene oxides and fluorocarbon polymers as a process aid in extrusion of polyolefins. These patents include U.S. Pat. No. 4,855,360 issued Aug. 8, 1989 which discloses and claims a composition of matter comprising the polyolefin and the process aid; U.S. Pat. No. 5,015,693 which claims the process aid per se; U.S. Pat. Nos. 4,863,983 issued Sep. 5, 1989 and 4,983,677 issued Jan. 8, 1991 which disclose and claim the use of an organophosphite in conjunction with the fluoropolymer as a process aid.

The first two 3M patents teach that the ratio of fluoropolymer to glycol must be from 1:1 to 1:10. That is the glycol must always be used in excess of the fluoropolymer.

U.S. Pat. No. 4,829,116, issued May 9, 1989 discloses a polyolefin molding composition comprising linear low density polyethylene (LLDPE); a fluorine containing polymer such as a polymer of vinylidene fluoride and hexafluoropropylene; and a wax such as an ester of montanic acid. The patent does not teach the use of ethers of glycols.

The present invention seeks to provide a preferred composition of an extrudable polymer, a fluoropolymer, a $C_{1-4}$ alkyl ether of a polyalkylene glycol, and a metal oxide in which the weight ratio of ether to fluoropolymer is from 0.60:1 to 0.90:1, most preferably from about 0.65:1 to 0.85:1.

SUMMARY OF THE INVENTION

In accordance with the broadest aspects of the present invention there is provided an extrudable composition comprising:
  i) a predominant amount of an olefin polymer;
  ii) from 0.01 to 1 weight % of one or more $C_{1-4}$ alkyl ethers of poly $C_{2-6}$ ethylenically unsaturated glycols and mixtures thereof, said ethers having a weight average molecular weight less than 20,000;
  iii) from 0.01 to 1 weight % of fluoropolymer having an atomic ratio of fluorine to carbon of at least 1:2; and
  iv) from 50 to 400 ppm of a metal oxide or hydrotalcite $(Mg_6Al_2(OH)_{16}CO_3 \cdot 4H_2O)$, the weight ratio of component ii) to component iii) being from 0.60:1 to 0.90:1.

The present invention also provides blown film (typically from 0.20 to 30 mils thick), and coated wire or optical cable made using the above compositions.

The compositions of the present invention may also be useful in extrusion of pipes or tubing and the extrusion of a thick film (typically greater than 20 mils) or geomembranes.

BRIEF DESCRIPTION OF THE DRAWINGS

FIG. 1 is a (log/log) plot of the apparent viscosity of blends of the present invention and the prior art as a function of shear rate. The reproducibility of this data was confirmed by changing the run order.

DETAILED DESCRIPTION

The major or predominant component in the compositions of the present invention is an extrudable polymer. The predominant component is present in an amount of at least about 98% by weight (weight %) of the base composition. That is the composition may include pigments and fillers in a typical amount but they would not be considered a part of the base component.

The extrudable polymer may be a number of extrudable polymers such as polyethylene or a copolymer such as an ethylene alpha olefin copolymer. Typically the olefin polymer comprises at least 85 weight % of one or more $C_{2-3}$ alpha olefins and up to 15 weight % of one or more $C_{4-8}$ alpha olefins. Preferably, the olefin comprises at least 85 weight % of ethylene and up to 15 weight % of one or more $C_{4-8}$ alpha olefins. Suitable $C_{2-3}$ alpha olefins are ethylene and propylene. Suitable $C_{4-8}$ alpha olefins include butene, 2-methyl pentene, hexene, and octene.

The olefin polymer may be prepared by conventional processes. In the case of alpha olefin polymers the polymerization may be in gas phase (that is at relatively low pressures below 500 psi, preferably below about 250 psi; at temperatures below about 130° C.; and using a fluidized bed catalyst such as the process patented by Union Carbide Corporation), to produce products such as high density (e.g. having a density greater than 0.935, preferably greater than 0.940 g/cc) and low density polyethylene (having a density from about 0.910 to 0.935 g/cc); in solution (a process at high temperatures typically from about 130° to 300° C., by dissolving ethylene and other comonomer(s) in a solvent such as hexane and in the presence of a coordination catalyst such as those disclosed in a number of patents in the name of DuPont) to produce either low pressure, low to medium density polyethylene, or high pressure low density polyethylene or slurry polymerization (such as polypropylene or ethylene copolymers) initiated by a co-ordination catalyst or in the case of high pressure polymerization by free radicals. The details of such types of polymerization are generally known to those skilled in the art of polymerization.

Depending on the type of polymerization the olefin polymer may have a molecular weight (weight average-Mw) from about 100,000 up to 1,000,000 typically from about 150,000 to 350,000.

The second component in the compositions of the present invention is a $C_{1-4}$ alkyl ethers of poly $C_{2-8}$ ethylenically unsaturated glycols, and mixtures thereof said ether having a molecular weight less than 20,000. Preferably the weight average molecular weight (Mw) of the glycol is less than 10,000. Most preferably the glycol has a molecular weight (Mw) from 2,500 to 6,000. Suitable ethers include methyl ethers comprising on average from 30 to 80 ethylene oxide units. Applicants are using the phrase "on average" as the glycols are mixtures and are best characterized by an average number of alkylene oxide units in the composition while there may be in the composition individual glycol molecules having a greater or lesser number of alkylene oxide units.

The $C_{1-4}$ alkyl ethers of poly $C_{2-6}$ ethylenically unsaturated glycols may be used in the compositions of the present invention in an amount from 0.01 to 1, preferably 0.01 to 0.18% based on the weight of the total composition (weight %).

The third component in the compositions of the present invention is a fluoropolymer having an atomic ratio of fluorine to carbon of at least 1:2; preferably 1:1. Typically, the fluoropolymer is a polymer comprising one or more monomers selected from the group consisting of perfluoropropylene, vinylidene fluoride, tetrafluoroethylene, chlorotrifluoroethylene, pentafluoropropylene and hexafluoropropylene. Preferably the fluoropolymer is a copolymer comprising from 50 to 85 mole % of vinylidene fluoride and from 15 to 50 mole % of one or more monomers selected from the group consisting of tetrafluoroethylene and perfluoroethylene.

The fluoropolymer component is present in the compositions of the present invention in an amount from 0.01 to 1, preferably from 0.015 to 0.20% by weight based on the total weight of the composition (weight %).

In the compositions of the present invention the weight ratio of the $C_{1-4}$ alkyl ether of a poly $C_{2-6}$ ethylenically unsaturated glycol to fluoropolymer may be from 0.60:1 to 0.90:1, preferably from 0.65:1 to 0.85:1.

The fourth component in accordance with the present invention is a weak metal base. The metal base may be a metal oxide of an alkaline earth or a transition metal or hydrotalcite ($Mg_6Al_2(OH)_{16}CO_3.4H_2O$). A particularly useful metal base is zinc oxide. The zinc oxide may be incorporated into the composition in an amount from at least 25, preferably from 50 to 500, most preferably from 100 to 300 parts per million (ppm). Useful metal bases include hydrotalcite ($Mg_6Al_2(OH)_{16}CO_3.4H_2O$) and zinc oxide, preferably zinc oxide. The zinc oxide may be included in a master batch comprising antioxidant, and low molecular weight $C_{1-4}$ alkyl ether of a poly $C_{2-6}$ ethylenically unsaturated glycol. A suitable masterbatch composition might comprise from 20 to 30 weight % of an antioxidant (such as IRGANOX™ (of Ciba Geigy)), from 10 to 20 weight % of zinc oxide and the balance of a $C_{1-4}$ alkyl ether of a poly $C_{2-6}$ ethylenically unsaturated glycol (such as MPEG 5000 CARBOWAX™ (of Union Carbide)).

As noted above the compositions of the present invention may further include fillers, antioxidants (at least a primary and optionally a secondary antioxidant), pigments, opacifying agents and other adjuvants. For film applications preferably no pigment or filler is added and the film is clear or relatively clear. In other applications such as wire and cable (electrical or optical) the compound may contain a pigment/filler such as carbon black and other adjuvants (in these types of applications the unsubstituted olefin polymer may be grafted by extrusion with a functional ethylenically unsaturated monomer such as maleic anhydride in the presence of a free radical agent such as a peroxide).

Typically if an antioxidant (primary alone or optionally in combination with a secondary antioxidant) is used it is used in an amount from about 0.01 to 2, preferably 0.01 to about 1 weight %. Fillers may be incorporated into the compositions of the present invention in amounts up to about 50%, preferably less than about 30%.

Typically, the polymer compositions of the present invention will be prepared by melt blending. There are several methods which could be used to produce the compositions of the present invention. All the components may be dry blended in the required weight ratio in a suitable device such as a tumble blender. The resulting dry blend is then melted in suitable equipment such as an extruder. A master batch could be prepared with some of the olefin and the other ingredients. The masterbatch is then fed to an extruder and melt blended. In a third method the dry components of the blend may be metered directly into an extruder.

The extruder may be a twin or single screw extruder. If it is a twin screw extruder it may be operated in a co-rotating mode (i.e. both screws turning in the same direction) or in a counter rotating mode (i.e. the screws rotate in opposite directions).

The specific conditions for operation of any extruder will differ from that of any other extruder. The variations between machines may usually be resolved by non-inventive testing. Typically, laboratory twin screw extruders will operate within the following envelope of conditions. The barrel will be heated to a temperature from about 180 to 210, preferably from 190° to 200° C. The screw speed will be from 120 to 150, preferably from 120 to 130 RPM's. The back pressure on the extruder will be from about 1000 to 1300, preferably from 1100 to 1250 psi. As noted above the specific conditions for the operation of any specific extruder can readily be determined by one skilled in the art by non-inventive testing in view of the above envelop of conditions.

The extruder will typically extrude the polymer composition as strands which are then cooled and cut into pellets for subsequent use, typically film extrusion.

The film extruder may also be a single or twin screw extruder. The die may be a slot die or it may be an annular ring die extruding a film of the polymer alloy about a stable bubble of air. The film is collapsed after passing over or about the bubble. For laboratory scale film extrusion the extruder may be operated within the envelop of parameters as set forth in the examples.

The present invention will be illustrated by the following non-limiting examples.

EXAMPLE 1

In the examples the following ingredients were used.

The polyolefin was a commercially available polyolefin (having a density of 0.921 g/cm$^3$) sold by Novacor Chemicals Ltd under the trade mark NOVAPOL Y821.

The fluoropolymer was the process aid sold by Minnesota Mining and Manufacturing Company under the trade mark FX-9613 which is believed to be a vinylidene fluoride based polymer.

The $C_{1-4}$ alkyl ether of a poly ($C_{2-6}$ ethylenically unsaturated glycol was MPEG 5000 CARBOWAX™ (of Union Carbide) which is the methyl ether of polyethylene glycol having a molecular weight (Mw) of about 5,000.

A series of compounds were compared comprising the following formulations in parts by weight (e.g. grams):

| | |
|---|---|
| Fluoropolymer | 400 parts per million (in all blends) |
| Zinc Oxide | 150 parts per million (in all blends) |
| Silica | 3500 parts per million (in all blends) |
| MPEG 5000 CARBOWAX ™ | 350 parts per million (blends 2, 3, and 4) |
| PEG 3350 CARBOWAX ™ | 800 parts per million (blend 1 control) |

Note: PEG 3350 CARBOWAX ™ (of Union Carbide Corporation) is a low molecular weight (MW of about 3500) polyethylene glycol.

The blends were then run on Macro equipment under the following conditions:

| | |
|---|---|
| Melt temperature | 410°–425° F. (zones in the extruder barrel) (about 210°–220° C.) |
| Output | 75 to 80 lbs/hour (33 to 35 kg/hour) |
| Die Gap | 35 mil |
| Amps (motor) | 40–42 |
| Volts (motor) | 185 |

The samples were run to cause melt fracture and the time up to 60 minutes (e.g. if it took more than 60 minutes to clear hard melt fracture no number is given) to clear hard melt fracture was recorded. The results are set forth in table 1 below.

TABLE 1

| Blend | Time to clear Melt Fracture (minutes) |
|---|---|
| 1 | 40 |
| 2 | 40 |
| 3 | 50 |
| 4 | 40 |

The results show that the blends are comparable in melt fracture behaviour.

EXAMPLE 2

Blends 1 (control), 2, 3, and 4 from example 1 were then run through a capillary rheometer at 210° C. and the apparent viscosity (Pa.s) as a function of shear rate was measured. The results are set forth in table 2.

TABLE 2

| SHEAR RATE SEC$^{-1}$ | Apparent Viscosity (Pa · s) | | | |
|---|---|---|---|---|
| | BLEND 1 CONTROL | BLEND 2 | BLEND 3 | BLEND 4 |
| 19.2 | 3149 | 3007 | 2825 | 2734 |
| 38.4 | 2302 | 1936 | 1808 | 1665 |
| 57.6 | 1657 | 1409 | 1342 | 1245 |
| 76.8 | 1316 | 1152 | 1117 | 1048 |
| 96 | 1130 | 1015 | 990 | 940 |
| 115 | 1011 | 919 | 904 | 863 |
| 134 | 931 | 865 | 847 | 863 |
| 153 | 867 | 809 | 803 | 769 |
| 192 | 785 | 747 | 734 | 769 |
| 230 | 725 | 696 | 687 | 680 |

The apparent viscosity was then plotted as a function of shear rate on a log/log scale. The plot is shown in FIG. 1.

The data demonstrates that blends of the invention (e.g. blends 2, 3, and 4) having a weight ratio of methyl ether glycol to fluoropolymer of less than 0.90:1 are at least as effective as blend 1 (e.g. the prior art) using glycol and fluoropolymer in a ratio of greater than 1:1. Further the data shows that the differences in apparent viscosity decrease with increasing shear rate.

What is claimed is:

1. An extrudable composition comprising:
    i) a predominant amount of an olefin polymer;
    ii) from 0.01 to 1 weight % of a chemical selected from the group consisting of $C_{1-4}$ alkyl ethers of poly $C_{2-6}$ ethylenically unsaturated glycols and mixtures thereof, said ethers having a weight average molecular weight less than 20,000;
    iii) from 0.01 to 1 weight % of fluoropolymer having an atomic ratio of fluorine to carbon of at least 1:2; and
    iv) from 50 to 500 ppm of a metal oxide, or hydrotalcite ($Mg_6Al_2(OH)_{16}CO_3.4H_2O$), the weight ratio of component ii) to component iii) being from 0.60:1 to 0.90:1, further characterized in that said extrudable composition is in the form of an extruded coating on a wire or optical cable.

2. The composition according to claim 1, wherein said olefin comprises at least 85 weight % of ethylene and up to 15 weight % of one or more $C_{4-6}$ alpha olefins, component ii) has a weight average molecular weight less than 10,000 and is present in an amount from 0.01 to 0.18 weight %, said $C_{1-4}$ alkyl ether of poly $C_{2-4}$ ethylenically unsaturated glycol comprises on average from 30 to 80 ethylene oxide units, component iii) is a fluoropolymer copolymer comprising from 50 to 85 mole % of vinylidene fluoride and from 15 to 50 mole % of one or more monomers selected from the group consisting of tetrafluoroethylene and perfluoroethylene and is present in an amount from 0.15 to 0.20 weight %, and the weight ratio of component ii) to component iii) is from 0.70:1 to 0.90:1.

3. The composition according to claim 2, wherein the metal oxide is zinc oxide present in an amount from 100 to 500 ppm, and wherein the weight ratio of component ii) to component iii) is from 0.65:1 to 0.85:1.

4. The composition according to claim 2, in the form of an extruded coating on a wire or optical cable.

5. The composition according to claim 3, in the form of an extruded coating on a wire or optical cable.

6. The composition according to claim 1, in the form of an extruded pipe or tubing.

7. The composition according to claim 2, in the form of an extruded pipe or tubing.

8. The composition according to claim 3, in the form of an extruded pipe or tubing.

9. The composition according to claim 1, in the form of an extruded sheet or geomembrane.

10. The composition according to claim 2, in the form of an extruded sheet or geomembrane.

11. The composition according to claim 3, in the form of an extruded sheet or geomembrane.

\* \* \* \* \*